US008096779B2

(12) United States Patent
Rochegude et al.

(10) Patent No.: US 8,096,779 B2
(45) Date of Patent: Jan. 17, 2012

(54) ROTORCRAFT BLADE PROVIDED WITH A RADIAL SEGMENT AND WITH AT LEAST ONE FORWARDLY- AND/OR REARWARDLY-SWEPT SEGMENT

(75) Inventors: Bernard Rochegude, Marignane (FR); Jean-Francois Hirsch, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 1001 days.

(21) Appl. No.: 12/034,891

(22) Filed: Feb. 21, 2008

(65) Prior Publication Data
US 2008/0206064 A1 Aug. 28, 2008

(30) Foreign Application Priority Data

Feb. 23, 2007 (FR) ...................................... 07 01299

(51) Int. Cl.
*B64C 27/46* (2006.01)
(52) U.S. Cl. ...................................................... 416/226
(58) Field of Classification Search .............. 416/134 A, 416/226, 229 A, 229 R, 230, 233, 238, 241 A, 416/241 R; 428/190, 293.7, 299.1; 415/216.1
See application file for complete search history.

(56) References Cited

U.S. PATENT DOCUMENTS

| 2,734,586 | A | | 2/1956 | Wright et al. | |
| 3,216,881 | A | * | 11/1965 | Pfeifer et al. | 428/114 |
| 3,731,360 | A | * | 5/1973 | Stone, Jr. | 29/889.71 |
| 3,950,115 | A | * | 4/1976 | Euler | 416/226 |
| 4,616,977 | A | * | 10/1986 | Schramm | 416/138 |
| 4,626,173 | A | * | 12/1986 | Mouille et al. | 416/134 A |
| 5,127,802 | A | | 7/1992 | Carlson et al. | |
| 5,269,658 | A | * | 12/1993 | Carlson et al. | 416/229 R |
| 5,375,978 | A | * | 12/1994 | Evans et al. | 416/230 |
| 6,116,857 | A | * | 9/2000 | Splettstoesser et al. | 416/228 |
| 6,155,784 | A | * | 12/2000 | Carter, Jr. | 416/134 A |
| 7,246,998 | B2 | * | 7/2007 | Kovalsky et al. | 416/87 |
| 7,331,765 | B2 | * | 2/2008 | Falchero et al. | 416/228 |
| 2005/0158175 | A1 | | 7/2005 | Flachero et al. | |
| 2008/0310964 | A1 | * | 12/2008 | Llorente Gonzalez et al. | 416/226 |
| 2010/0303631 | A1 | * | 12/2010 | Payne et al. | 416/226 |

FOREIGN PATENT DOCUMENTS

| EP | 1557354 A1 | 7/2005 |
| FR | 2252916 | 6/1975 |
| FR | 2865189 A1 | 7/2005 |
| GB | 625778 | 12/1947 |
| JP | 2002308192 A | 10/2002 |
| JP | 2005206148 A | 8/2005 |
| WO | WO 2006002621 A1 * | 1/2006 |

OTHER PUBLICATIONS

French Search Report for Application No. 690422, mailed Oct. 12, 2007, 2 pages.

* cited by examiner

*Primary Examiner* — Edward Look
*Assistant Examiner* — Adam R. Benson
(74) *Attorney, Agent, or Firm* — Brooks Kushman P.C.

(57) ABSTRACT

A rotorcraft blade (P) is provided in succession with a radial segment (1) and then a swept segment (2), the swept segment (2) being provided with at least one forwardly-swept segment (2') and/or rearwardly-swept segment (2"). In addition, the blade has a single spar coming from the blade root. The invention is remarkable in that the single spar includes a radial spar (10) in the radial segment (1), after which the single spar splits where the radial segment (1) becomes the swept segment (2) to form thereafter in the swept segment (2) a primary spar (11) and a secondary spar (12).

18 Claims, 1 Drawing Sheet

ROTORCRAFT BLADE PROVIDED WITH A RADIAL SEGMENT AND WITH AT LEAST ONE FORWARDLY- AND/OR REARWARDLY-SWEPT SEGMENT

The present invention relates to a rotorcraft blade provided with a segment that is radial in the vicinity of its blade root, and followed by at least one segment that is swept forwardly and/or rearwardly.

BACKGROUND OF THE INVENTION

It should be observed that the sweep of an aerodynamic surface serves to specify the orientation of said surface relative to its direction of forward advance.

Thus, a forwardly-swept segment of a blade is directed in the advance direction of the blade, whereas a rearwardly-swept segment is directed in the direction opposite to the advance direction.

It can readily be understood that a radial segment, said for convenience to have zero sweep, is perpendicular to the forward direction of the blade. Such a radial segment of a blade of a main rotor of a helicopter is thus directed along the reference radius of the rotor, hence the use of the term "radial".

Below, the term "radial segment" is used to specify a segment having zero sweep, and the term "swept segment" is used to designate a segment that is forwardly- and/or rearwardly-swept.

Document FR 2 865 189 discloses a rotorcraft blade that possesses in succession, starting from the blade root: a segment that is radial, and thus of zero sweep; a forwardly-swept segment; and then a rearwardly-swept segment.

A blade of that type is particularly advantageous insofar as its shape significantly reduces the acoustic signature of the rotor fitted therewith, while nevertheless preserving its dynamic and aerodynamic characteristics.

Nevertheless, to ensure that the blade possesses sufficient strength, it is appropriate in particular firstly to take up the centrifugal forces exerted on the blade, and secondly to ensure that the leading edge of the blade can withstand impacts.

Conventionally, a blade comprises:
  at least one rigid spar based mainly on unidirectional inorganic fibers or on metal, which spar serves to withstand the centrifugal forces and to transmit them to the rotorcraft hub;
  bottom and top covering skins that provide stiffness in flapping and in drag, and that also provide the blade with the ability to withstand twisting, e.g. being made of bidirectional fabric based on inorganic fibers; and
  at least one filler box for guaranteeing geometrical continuity of the assembly and stability of the bottom and top covering skins.

A first type of blade fitted with a spar is known in which the spar extends from the blade root, and in particular from the fastenings between the blade and the hub, along the entire span of the blade, being arranged at the leading edge of the blade. For convenience in the text below, that type of spar is referred to as a "leading-edge" spar.

A leading-edge spar is highly effective in general, and furthermore it protects the leading edge against impacts, but it does not appear to be capable of satisfying the requirements of a blade comprising both a radial segment and a forwardly- and/or rearwardly-swept segment.

Under the effect of centrifugal force, such a blade tends to "unfold" in order to become completely straight. Under such conditions, the leading-edge spar is found to be insufficient, since it too is likely to unfold insofar as, given its location in the leading edge, it also presents a broken-line profile corresponding to the radial and the forwardly- and/or rearwardly-swept segments.

A second type of blade provided with a spar is known in which the spar extends from the blade root along the span of the blade, being arranged inside the blade. For convenience, that type of spar is referred to in the text below as a "central spar".

For example, a central spar is to be found in document U.S. Pat. No. 5,127,802 which describes a tubular central spar made of glass fibers, which spar is additionally reinforced by top and bottom plates made of carbon fibers.

Since it does not extend along the leading edge of the blade, such a central spar can be radial, i.e. it can be directed along the radius of the rotor.

Nevertheless, if that spar were to be used in a blade presenting a radial segment and a swept segment, the central position of the spar relative to the chord of the blade would vary along its span. For example, if it lies in the middle of the chord in the radial segment it will necessarily come closer to the trailing edge of the blade in a forwardly-swept segment. In contrast, it will necessarily come closer to the leading edge in a rearwardly-swept segment.

Consequently, it is appropriate to overdimension the spar in the forwardly-swept segment, thereby leading to problems of weight and also of centering for the blade, since a blade needs to be centered approximately in the vicinity of its pitch axis.

A third type of blade is known that combines both a leading-edge spar and a central spar along the span of the blade. The leading-edge spar is separated from the central spar by a torsion box having its walls constituted by said spars and the bottom and top covering skins, as disclosed for example in document U.S. Pat. No. 5,346,367.

That solution can be attractive for a blade provided with a radial segment and a swept segment, but it can lead to harmful overdimensioning and to excess weight.

Finally, a fourth type of blade is known that is provided with a spar referred to as a "distributed spar". Such a spar consists in a leading-edge spar that is extended a little by portions extending against the bottom and top skins of the blade.

More precisely, the distributed spar comprises first inorganic fibers placed flat against the front portion of the top skin and second inorganic fibers placed flat against the front portion of the bottom skin. These fibers meet at the leading edge of the blade to constitute a conventional leading-edge spar.

The distributed spar satisfies present requirements while avoiding a large increase in the weight of the blade.

Nevertheless, there remains the problem of the broken-line shape of the leading edge of a blade that has a radial segment and a swept segment. Having a radial segment followed by at least one forwardly- and/or rearwardly-swept segment leads to the fibers being distributed in extremely complex manner along the span. This makes fabrication difficult to reproduce, and above all difficult to automate, given the degree of precision required in making the blade.

OBJECTS AND SUMMARY OF THE INVENTION

An object of the present invention is to provide a blade that makes it possible to overcome the above-mentioned limitations, using a spar that is optimized in terms of weight and that is capable of being fabricated in automatic and reproducible manner.

According to the invention, a rotorcraft blade is provided in succession, along the pitch axis of the blade going from the blade root that is fastened to the rotorcraft rotor hub towards the free end of the blade that is disposed at the end remote from the hub, with a radial segment followed by a swept segment, the swept segment being provided with at least one forwardly- and/or rearwardly-swept segment. In addition, the blade has a single spar extending from the blade root, the radial and swept segments each having a respective leading edge and trailing edge and also a top skin and a bottom skin.

The invention is remarkable in that the single spar comprises a radial spar in the radial segment, with the single spar then splitting where the radial segment becomes a swept segment so as to form thereafter a primary spar and a secondary spar in the swept segment. Consequently, the blade possesses a single spar only that comprises firstly a portion in the radial segment, i.e. the radial spar, and secondly two portions in the swept spar, more precisely a primary spar and a secondary spar.

It should be observed that the pitch axis of the blade is a longitudinal pivot axis about which the blade turns on changing pitch in order to modify its angle of incidence relative to the external flow of air.

Advantageously, the single spar comprising the radial, the primary, and the secondary spars, is made up in particular of unidirectional inorganic fibers so as to be capable of transmitting centrifugal forces to the rotorcraft hub. Thus, the radial and the secondary spars comprise unidirectional fibers directed along the pitch axis and the primary spar comprises unidirectional fibers directed parallel to the leading edge of the swept segment.

The radial spar is preferably arranged in the leading edge of the radial segment. Such a segment is thus well secured relative to the hub by the spar, which, in fact, acts as a leading-edge spar.

Similarly, the primary spar is arranged in the leading edge of the swept segment. In contrast, the secondary spar is arranged in a central portion of the swept segment, with this central portion lying between the leading edge and the trailing edge of the swept segment.

Consequently, the swept segment has a leading-edge spar represented by the primary spar that comes from the radial spar. Nevertheless, in order to avoid any unfolding effect, the radial spar splits also into a central spar, specifically the secondary spar.

Such a structure thus satisfies the problem completely without excessively increasing the weight of the blade. In addition, ordinary fabrication techniques can be implemented, thereby guaranteeing fabrication at lower cost.

There is no point in overdimensioning the secondary spar because of the presence of the primary spar, thereby avoiding the drawbacks associated with the weight and the centering of the blade, for example.

In a first embodiment, the secondary spar is in the form of a rib interconnecting the top and bottom skins. The secondary spar is then an elongate element with its height extending between the bottom and top skins of the swept segment, so that the elongate element thus interconnects the bottom and top skins.

In a second embodiment, the secondary spar has a top secondary spar placed flat against the top skin of the swept segment, and/or a bottom secondary spar placed flat against the bottom skin of said swept segment. The secondary spar is then a distributed spar in this embodiment, thus making it possible to optimize the way in which it is arranged, in particular close to the free end of the blade where the blade is of small thickness.

In addition, it is useful for the secondary spar to be arranged in line with the radial spar. This amounts to saying that the secondary spar is in alignment with the leading edge of the radial segment when the radial spar is a leading-edge spar.

Thus, the radial spar and the secondary spar both extend along the same axis, and more precisely along the pitch axis of the blade. This is effective in increasing the capacity of the spar for transmitting centrifugal forces to the rotor.

Furthermore, since a portion of the single spar is made up of the radial spar extended by said secondary spar, said portion presents a length lying between 90% and 95% of the total length of the blade. Since the thickness at the end of the blade tapers, the usefulness of the secondary swept decreases towards the end of the blade, and it also becomes more difficult to arrange the spar therein. In order to optimize the weight of the blade and avoid penalizing fabrication thereof, the secondary spar is thus terminated before reaching the free end of the blade.

Nevertheless, depending on requirements, said portion of the spar may optionally extend along the full length of the blade, and thus be equal in length thereto.

In order to improve the distribution of weight and in order to transmit centrifugal forces more effectively, in a variant of the invention, the single spar comprises first reinforcement reinforcing at least part of the top skin of the blade between the primary spar and the secondary spar.

This first reinforcement serves in particular to cover the zone that does not have a secondary spar, if the secondary spar does not extend all the way to the end of the blade. Nevertheless, it is advantageous for the reinforcement to be total rather than partial, covering all of the zone between the primary spar and the secondary spar.

The first reinforcement is structurally a spar serving solely to transmit centrifugal forces. The first reinforcement is made of fabric essentially comprising unidirectional inorganic fibers directed along the axis of the blade and naturally associated with appropriate resins, and not by a fabric having essentially balanced quantities of inorganic fibers in warp and weft directions, as is conventional.

Similarly, the single spar includes second reinforcement reinforcing at least part of the bottom skin of the blade between the primary spar and the secondary spar. The second reinforcement is then made of unidirectional inorganic fibers and not in the form of a bidirectional fabric, the fibers extending along said reference radius.

Finally, and advantageously, the swept segment comprises in succession a forwardly-swept segment and a rearwardly-swept segment, the blade thus having in succession, going from the blade root to the free end of the blade, a radial segment followed by a swept segment, itself made up of a forwardly-swept segment and then of a rearwardly-swept segment. This configuration is effective in combating noise, and the invention relating to a single spar that divides is particularly well adapted thereto.

BRIEF DESCRIPTION OF THE DRAWINGS

The invention and its advantages appear in greater detail in the context of the following description which shows preferred embodiments given without any limiting character and with reference to the accompanying figures, in which.

MORE DETAILED DESCRIPTION

Elements present in more than one of the figures are given the same references in each of them.

Figure 1:
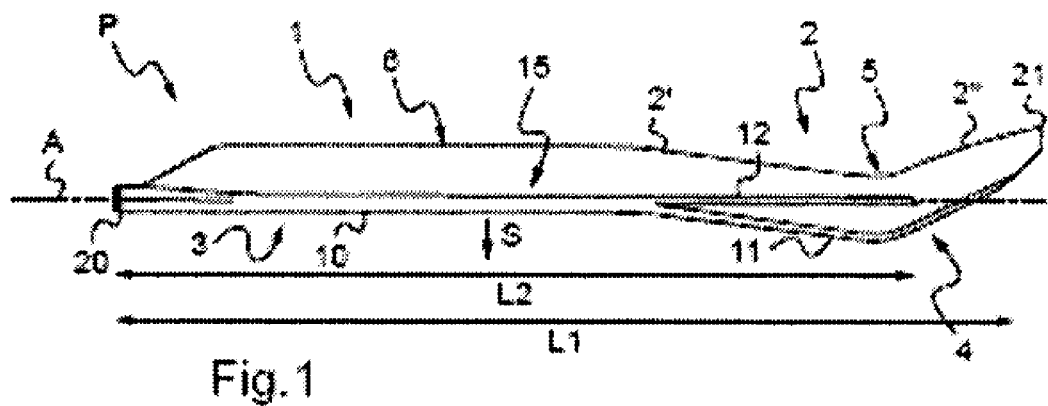
FIG. 1 is a diagrammatic view of a blade of the invention.

FIG. 1 is a diagrammatic view of a blade P of the invention for a rotorcraft, such as a helicopter.

The blade P is fastened to a rotorcraft hub (not shown) via its blade root 20 to participate in providing the rotorcraft with lift and propulsion.

The blade P comprises in succession from its root 20 or shank to its free end 21 situated at the end of the blade P that is remote from the rotor: a radial segment 1 followed by a swept segment 2 comprising a forwardly-swept segment 2' and a rearwardly-swept segment 2".

It is recalled that the radial segment 1 is perpendicular to the forward travel direction S of the blade. In contrast, the swept segment 2 is directed in the forward direction S and/or in the direction opposite to the forward direction S. More precisely, in the example described, the forwardly-swept segment 2' of the swept segment 2 is directed in the forward direction S, while the rearwardly-swept segment 2' of the swept segment 2 is directed in the direction opposite to the forward direction S.

Figure 3:
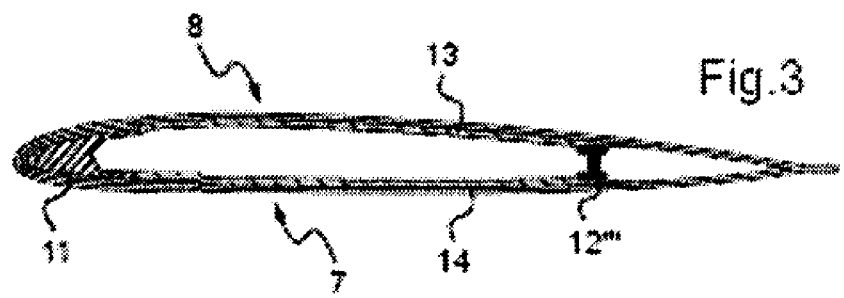
FIG. 3 is a section of the swept segment in a first embodiment.

In conventional manner, the radial segment 1 and the swept segment 2 have respective leading edges 3, 4 and trailing edges 6, 5. Similarly, the radial and swept segments 1 and 2 are provided with a pressure side skin (or bottom skin) 7 and a suction side skin (or top skin) 8, as shown in the section of FIG. 3.

Furthermore, it should be observed that the blade P is suitable for turning about a pitch axis A. This pitch-setting operation serves to vary the angle of incidence of the blade P relative to the flow of air through which it passes in order to increase the lift of the blade, for example, or else to reduce it.

Furthermore, in order to ensure that the centrifugal forces to which the blade P is subjected are transmitted to the hub, the blade P is provided with a single spar made up of unidirectional inorganic fibers directed along the pitch axis A, starting from the blade root 20.

In the radial segment 1, the single spar consists of a radial spar 10 that extends from the blade root 20. This radial spar is of the leading-edge type insofar as it is disposed at the leading edge 3 of the radial segment 1.

In the swept segment 2, the single spar possesses a primary spar 11 and a secondary spar 12.

Thus, the blade P has a single spar made up of a radial spar 10 that splits into a primary spar 11 and a secondary spar 12 where the radial segment 1 becomes the swept segment 2.

More precisely, the primary spar 11 is a leading edge spar arranged along the leading edge 4 of the swept segment 2.

In contrast, the secondary spar 12 is a central spar. It is arranged inside the blade, being disposed firstly between the bottom and top skins of the swept segment 2, and secondly between the leading edge 4 and the trailing edge 5 of the swept segment. In addition, the secondary spar 12 is advantageously placed on the pitch axis, and more particularly along the leading edge of the radial segment 1, and thus in alignment with the radial spar 10.

Centrifugal forces are then taken up by the primary spar 11 and the secondary spar 12, with the secondary spar also serving to prevent the blade P from unfolding. Consequently, because of the presence of the primary spar 11, there is no need to overdimension the secondary spar 12.

Thereafter, these centrifugal forces are transmitted to the radial spar to which the primary and secondary spars 11 and 12 are both connected, and finally to the hub of the rotorcraft.

The thickness of the blade in the vicinity of its free end 21 is small, so there is no need for the secondary spar 12 to extend all the way along the swept segment 2.

The length L2 of the spar portion 15 made up of the radial spar 10 and the secondary spar 12 is then shorter than the total length L1 of the blade P, said total length going from the blade root 20 to the free end 21. The length L2 preferably lies in the range 90% to 95% of the total length L1 of the blade P.

Figure 2:
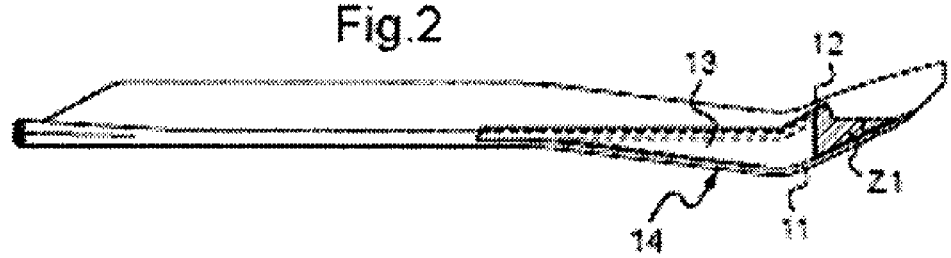
FIG. 2 is a diagrammatic view of a variant blade of the invention.

FIG. 2 shows a variant of the invention.

In this variant, the blade P is provided with first reinforcement 13 covering the inside of the top skin and second reinforcement 14 covering the inside of the bottom skin.

These first and second reinforcements 13, 14 are pieces of fabric constituted essentially by unidirectional inorganic fibers directed along the pitch axis A, and they constitute integral portions of the single spar.

They cover all of the space extending from the primary spar 11 to the secondary spar 12. The first and second reinforcements 13 and 14 are thus both secured to the radial spar 10, to the primary spar 11, and to the secondary spar 12.

These reinforcements participate actively in taking up axial forces only, and thus in transmitting only the axial forces exerted on the blade to the hub of the rotorcraft.

In accordance with another variant, the coverage is partial. For example, the reinforcements cover only the shaded zone Z1 in order to compensate for the absence of a secondary spar in the zone Z1. In this configuration, the first and second reinforcements 13, 14 are secured solely to the ends of the secondary spar 12 and of the primary spar 11.

FIG. 3 is a section through a swept segment 2" in a first embodiment.

This section shows in particular the secondary spar 12, the first reinforcement 14 covering the inside of the bottom skin 7 of the blade and the secondary reinforcement 13 covering the inside of the top skin 8 of the blade.

In this first embodiment, the secondary spar 12 is an elongate element 12''' of I-section. This elongate element is thick, its height extending from the bottom skin 7 to the top skin 8 of the blade.

Figure 4:
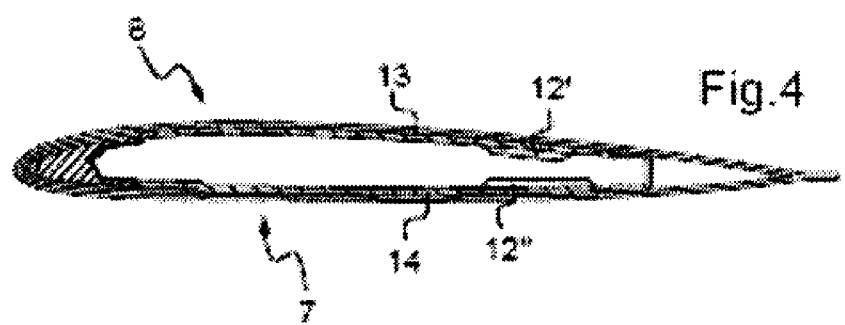
FIG. 4 is a section of the swept segment in a second embodiment.

FIG. 4 is a section through a swept segment 2" in a second embodiment.

In this embodiment the secondary spar is a kind of distributed spar. Consequently, it comprises a top secondary spar 12' placed flat against the inside of the top skin 8 of the swept segment 2.

Similarly, the secondary spar 12 has a bottom secondary spar 12" placed flat against the inside of the bottom skin 7 of the swept segment 2.

Naturally, the present invention is capable of numerous variations in the manner in which it is implemented. Although several embodiments are described above, it will be understood, that it is not conceivable to identify exhaustively all possible embodiments. It is naturally possible to envisage replacing any of the means described by equivalent means without going beyond the ambit of the present invention.

For example, the radial spar described splits into a primary spar and a secondary spar where the radial segment becomes a swept segment.

Nevertheless, it is possible to envisage offsetting the position of this separation a little towards the blade tip through a distance of the order of 10% of the total length L1 of the blade.

What is claimed is:

1. A rotorcraft blade provided in succession, along a pitch axis of the blade going from a root of the blade fastened to a rotorcraft rotor hub towards a free end of the blade remote from said hub, the rotorcraft blade comprising a radial segment followed by a swept segment, said swept segment being provided with at least one of a forwardly-swept segment and a rearwardly-swept segment said blade having a single spar extending from said blade root, said radial and swept segments each having a respective leading edge and trailing edge, and also a top skin and a bottom skin, wherein said single spar has a radial spar in the radial segment, and then divides where the radial segment becomes the swept segment so as to form in said swept segment both a primary spar and a secondary spar.

2. A blade according to claim 1, wherein said single spar is made up of unidirectional inorganic fibers.

3. A blade according to claim 2, wherein said radial spar and the secondary spar comprise unidirectional inorganic fibers extending along the pitch axis.

4. A blade according to claim 2, wherein said primary spar comprises unidirectional inorganic fibers directed parallel to the leading edge of said swept segment.

5. A blade according to claim 1, wherein the radial spar is arranged in the leading edge of the radial segment.

6. A blade according to claim 1, wherein said primary spar is arranged in the leading edge of the swept segment.

7. A blade according to claim 1, wherein said secondary spar is arranged in a central portion of the swept segment, said central portion extending between the leading edge and the trailing edge of said swept segment.

8. A blade according to claim 1, wherein said secondary spar is an elongate element of height extending from the bottom skin to the top skin of the swept segment.

9. A blade according to claim 1, wherein said secondary spar comprises a top secondary spar disposed flat against the top skin of said swept segment.

10. A blade according to claim 1, wherein said secondary spar comprises a bottom secondary spar disposed flat against the bottom skin of said swept segment.

11. A blade according to claim 1, wherein said secondary spar is arranged in alignment with said radial spar.

12. A blade according to claim 1, wherein said secondary spar is arranged in alignment with the leading edge of the radial portion.

13. A blade according to claim 1, wherein for a portion of the single spar being made up of the radial spar extended by said secondary spar, said portion has a length ($L2$) lying in the range 90% to 95% of the total length ($L1$) of the blade ($P$).

14. A blade according to claim 1, wherein said single spar includes first reinforcement reinforcing at least part of the top skin of the blade ($P$) between said primary spar and said secondary spar.

15. A blade according to claim 14, wherein said first reinforcement is made of fabric constituted essentially by unidirectional inorganic fibers directed along said pitch axis ($A$).

16. A blade according to claim 1, wherein said single spar includes second reinforcement reinforcing at least part of the bottom skin of the blade ($P$) between said primary spar and said secondary spar.

17. A blade according to claim 16, wherein said second reinforcement is made of fabric constituted essentially by unidirectional inorganic fibers directed along said pitch axis ($A$).

18. A blade according to claim 1, wherein the swept segment comprises in succession a forwardly-swept segment and a rearwardly-swept segment.

* * * * *